United States Patent
Kimura

(10) Patent No.: US 7,354,207 B2
(45) Date of Patent: Apr. 8, 2008

(54) LENS MOUNT STRUCTURE

(75) Inventor: Shuzo Kimura, Saitama (JP)

(73) Assignee: Fujinon Corporation, Saitama (JP)

( * ) Notice: Subject to any disclaimer, the term of this patent is extended or adjusted under 35 U.S.C. 154(b) by 325 days.

(21) Appl. No.: 11/084,664

(22) Filed: Mar. 18, 2005

(65) Prior Publication Data

US 2005/0213963 A1    Sep. 29, 2005

(30) Foreign Application Priority Data

Mar. 25, 2004    (JP)    ............................ 2004-088703

(51) Int. Cl.
  *G03B 17/14*    (2006.01)
  *G02B 7/14*    (2006.01)
(52) U.S. Cl. ...................................... 396/531; 359/828
(58) Field of Classification Search ................ 396/529, 396/531; 348/360; 359/819, 827, 828
  See application file for complete search history.

(56) References Cited

U.S. PATENT DOCUMENTS 2,260,991 A * 10/1941 Gorey .......................... 359/827
4,281,895 A * 8/1981 Mohr .......................... 359/827

FOREIGN PATENT DOCUMENTS

JP            5-72618       3/1993
JP            9-211656      8/1997

* cited by examiner

*Primary Examiner*—W. B. Perkey
(74) *Attorney, Agent, or Firm*—Jordan and Hamburg LLP

(57) ABSTRACT

To provide a lens mount structure which can align a lens optical axis with high accuracy without constituting a complicated lens mount structure, the lens mount structure for mounting a lens barrel to a main body of a camera, or the like, by retaining flange portions formed along an outer periphery of a base body of a lens barrel with retaining portions formed on a cylindrical mount disposed on a front of the support unit, the center of gravity of the cylindrical barrel between an front edge and the flanges, wherein reference surfaces for aligning a lens optical axis of the lens barrel mounted on the main body are formed on the respective flange portions; the reference surfaces are formed while facing the center of gravity of the lens barrel, and the reference surfaces are given a slope; and the retaining portions retain the flange portions while the reference surfaces formed on the flange portions remain in contact with retaining surfaces formed on the respective retaining portions.

4 Claims, 4 Drawing Sheets

_US 7,354,207 B2_

LENS MOUNT STRUCTURE

FIELD OF THE INVENTION

This invention relates to a lens mount structure for mounting a lens barrel to a main body such as a camera or a projector and demounting the same therefrom.

BACKGROUND OF THE INVENTION

Cameras, such as a camera and a projector, involve a necessity for replacement of a lens. Hence, a lens mount structure used for mounting and demounting a main body, such as a camera, to a lens barrel has hitherto been known (see JP-A-5-072618 and JP-A-9-211656).

For instance, as shown in FIG. 4, a related-art lens mount structure used for mounting a lens barrel to a camera main body and demounting the same has a flange portion 101 formed along an outer periphery of a base body of a lens barrel 100. A cylindrical mount 105 is disposed at the front of a camera main body 103. The mount 105 is screw-engaged with the front of the camera main body 103. The flange portion 101 of the lens barrel is sandwiched between the front of the camera main body 103 and the mount 105, to thus attach the lens barrel 100 to the camera main body 103.

In the related-art lens mount structure, a reference surface 102 is set on a ground side of the flange portion. The reference surface 102 is brought into contact with a mount surface 104 on the front of the camera main body 103, thereby aligning the lens optical axis of the lens barrel. In the related-art structure shown in FIG. 4, there is provided a mechanism for retaining and adjusting the flange by means of screw-engagement, whereby the reference surface 102 of the flange portion is brought into contact with the mount surface of the camera main body 103, to thus align the lens optical axis of the lens barrel.

However, according to the related-art lens mount structure, even when the cylindrical mount 105 is tightly screw-engaged with the front of the camera main body, if a nominal clearance exists, the lens barrel tilts under its own weight, because the center of gravity of the lens barrel is situated at a position closer to a front edge thereof than to the position where the flange is formed. The reference surface 102 of the lens barrel fails to come into intimate contact with the mount surface 104 of the camera main body 103, resulting in misalignment of the lens optical axis of the lens barrel.

SUMMARY OF THE INVENTION

This invention aims at providing a lens mount structure which enables high-precision alignment of a lens optical axis of a lens barrel when the lens barrel is mounted on a main body, such as a camera or a projector, and a lens barrel and a lens mount of the same.

To achieve the object, this invention provides a lens mount structure includingng: a base body; and a plurality of flanges along an outer periphery of the base body, the lens barrel having a center of gravity between a front edge of the lens barrel and the flanges; and a cylindrical mount disposed in front of a support unit (i.e., a main body of a camera or the like), the cylindrical mound having a plurality of portions, each of the portions retaining one of the flanges so that the lens mount structure mounts the lens barrel to the support unit, wherein each of the flanges has a reference surface on a side thereof, the side facing the center of gravity of the lens barrel; the reference surface has a slop with respect to a plane perpendicular to a lens optical axis, and each of the portions of the cylindrical mount has a retaining surface in contact with one of the reference surfaces so that the potions of the cylindrical mount retain the flanges of the lens barrel, and the reference surface aligns the lens optical axis of the lens barrel mounted on the support unit.

A lens barrel of the present invention includes a base body; and a plurality of flanges along an outer periphery of the base body, the lens barrel having a center of gravity between a front edge of the lens barrel and the flanges, wherein each of the flanges has a reference surface on a side thereof, the side facing the center of gravity of the lens barrel; and the reference surface has a slop with respect to a plane perpendicular to a lens optical axis.

A lens mount of the present invention includes a plurality of portions, each of the portions retaining one of the flanges so that a lens barrel is disposed in front of a support unit, wherein each of the portions of the cylindrical mount has a retaining surface having a slop with respect to a plane perpendicular to a lens optical axis.

According to the present invention, tilting of a lens barrel, which would otherwise occur under its own weight, can be prevented without constituting a complicated lens mount structure; a lens optical axis can be aligned with high accuracy; and the lens barrel can be readily mounted to a main body of a camera or the like.

DETAILED DESCRIPTION OF THE INVENTION

An embodiment of the present invention will be described hereunder by reference to the drawings.

The embodiment to be described hereunder exemplifies a lens mount structure of a camera used for mounting a lens barrel to a camera main body and demounting the lens barrel therefrom. However, the present invention is not limited solely to the lens mount structure of the camera, but also encompasses a lens mount structure used for mounting a projection lens to a projector main body and demounting the same. Specifically, this invention is directed toward a lens mount structure for mounting and demounting a lens barrel to and from a camera main body or the like, such as a camera or a projector.

A lens barrel 10 according to an embodiment of the present invention will be described by reference to FIG. 1.

Figure 1A:
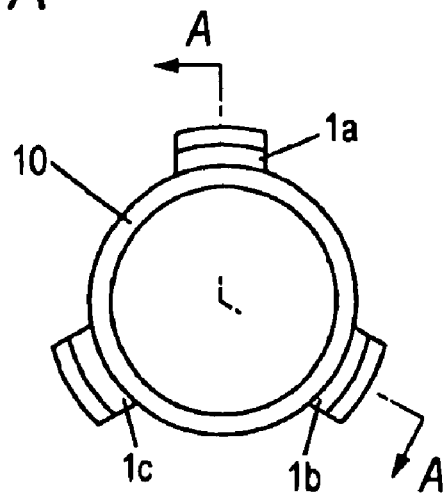
FIG. 1 is a view showing a lens barrel according to an embodiment of the present invention.
Figure 1B:
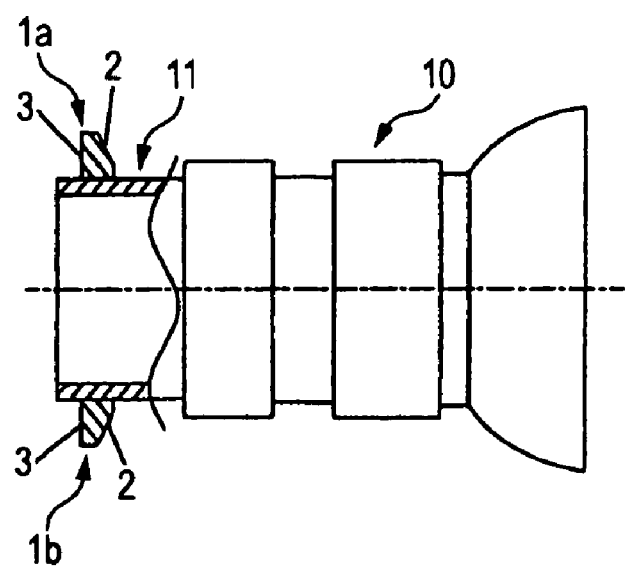
Figure 1C:
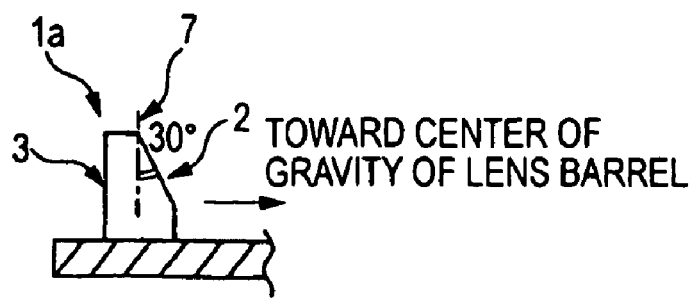

FIG. 1 shows the lens barrel 10 whose center of gravity is situated at a position closer to a front edge of the barrel than to a position where flanges are formed (i.e., between the front edge of the barrel and the flanges). FIG. 1A is a plan view of the lens barrel 10 when viewed from the front edge thereof; FIG. 1B is a cross-portional view taken along line A-A shown in FIG. 1A; and FIG. 1C is a fragmentary-enlarged cross-portional view of a flange portion 1a.

In this embodiment, three flanges 1a to 1c are disposed at uniform intervals along an outer periphery 11 of a base body of the lens barrel 10. A reference surface 2 is formed on each of flange portions 1a to 1c for aligning the lens optical axis of the lens barrel mounted on the camera main body.

As shown in FIG. 1B, in the lens barrel 10 of the present embodiment, the reference surfaces 2 formed on the respective flange portions 1a to 1c are formed not on ground sides 3 of the flange portions 1a to 1c facing a mount 20 (a camera main body), but on sides of the flange portions facing the front edge of the lens barrel.

The reference surfaces 2 formed so as to face the center of gravity of the lens barrel provided with slopes. The flange portions 1a to 1c are tapered. The slopes are preferably formed so as to fall within a range of 20° to 45° with respect to a plane 7 perpendicular to a lens optical axis of the lens barrel. In the present embodiment, a slope of 30° is provided (see FIG. 1c).

The mount 20 of the embodiment of the present invention will be described by reference to FIG. 2.

Figure 2A:
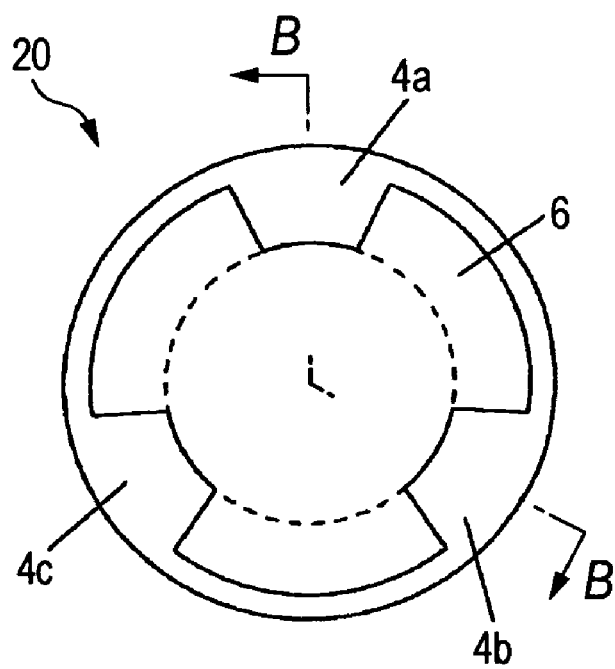
FIG. 2 is a view showing amount according to the embodiment of the present invention.
Figure 2B:
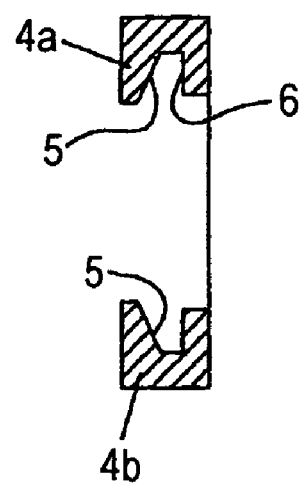

FIG. 2 shows the cylindrical mount 20 fixed on the front of a camera main body 21. FIG. 2A is a plan view of the mount, and FIG. 2B is a cross-portional view taken along line B-B shown in FIG. 2A.

In the present embodiment, three retaining portions 4a to 4c are formed at uniform intervals for retaining the flange portions 1a to 1c of the lens barrel 10. Retaining surfaces 5 with which the reference surfaces 2 of the flange portions come into contact are formed on the respective retaining portions 4a to 4c. The reference surfaces 2 are brought into contact with the retaining surfaces 5, thereby aligning the lens optical axis of the lens barrel mounted on the camera main body.

Specifically, the flange portions 1a to 1c are inserted into a space between mount surfaces 6 and the retaining surfaces 5 of the respective retaining portions 4a to 4c, and the flange portions 1a to 1c are retained by being nipped between the mount surfaces 6 and the retaining surfaces 5. At this time, the reference surfaces 2 formed on the flange portions 1a to 1c are brought into contact with the retaining surfaces 5.

FIG. 3 shows a lens mount structure according to the present invention.

Figure 3A:
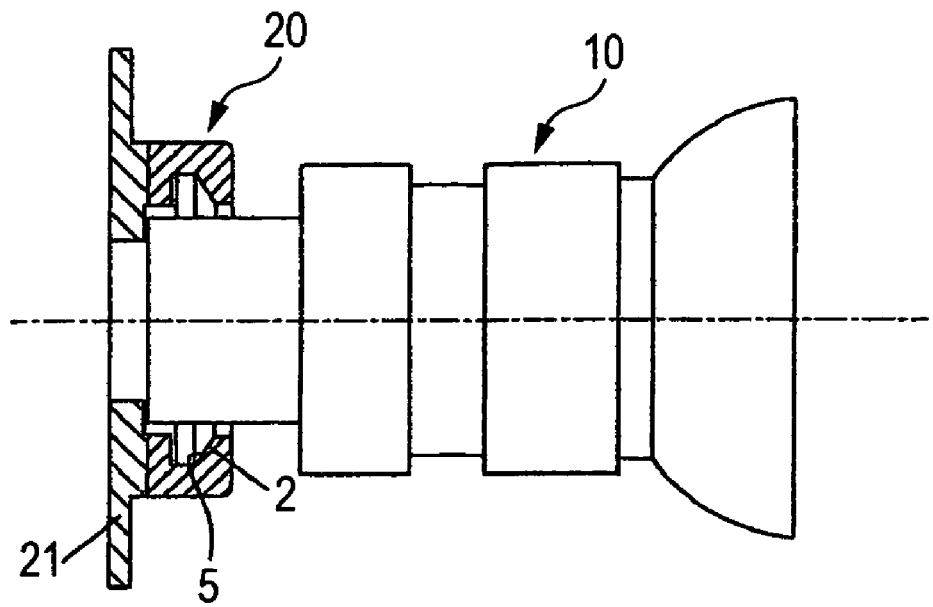
FIG. 3 is a view showing a lens mount structure according to the embodiment of the present invention.

An embodiment shown in FIG. 3A is directed toward a lens mount structure. In this mount structure, the flange portions 1a to 1c formed along the outer periphery 11 of the base body of the lens barrel 10 are retained by the retaining portions 4a to 4c formed on the cylindrical mount 20 disposed on the front 21 of the camera main body. Thereby, the lens barrel—whose center of gravity is situated at a position closer to the front edge of the lens barrel than to the position where the flanges are formed—is mounted on the camera main body. The reference surfaces 2 formed on the sides of the respective flange portions 1a to 1c facing the center of gravity of the barrel are provided with a slope of 30° with respect to the plane perpendicular to the lens optical axis. The flange portions 1a to 1c are retained by the retaining portions 4a to 4c while the reference surfaces 2 remain in contact with the retaining surfaces 5 formed in the retaining portions 4a to 4c, thereby aligning the lens optical axis of the lens barrel mounted on the camera main body.

In the embodiment, the reference surfaces 2 are formed so as to face the center of gravity of the lens barrel. The flange portions 1a to 1c whose reference surfaces 2 are tapered are retained by the retaining portions 4a to 4c formed in the mount 20. The reference surfaces 2 of the flange portions 1a to 1c are brought into contact with the retaining surfaces 5 of the retaining portions 4a to 4c, thereby aligning the lens optical axis of the lens barrel mounted on the camera main body. Even when clearance exists between the flange portions and the retaining portions, the reference surfaces 2 and the retaining surfaces 5 come into intimate contact with each other under the weight of the lens barrel whose center of gravity is situated at the position closer to the front edge of the lens barrel than to the position where the flanges are formed, whereupon the lens optical axis of the lens barrel can be aligned with high accuracy.

Figure 3B:
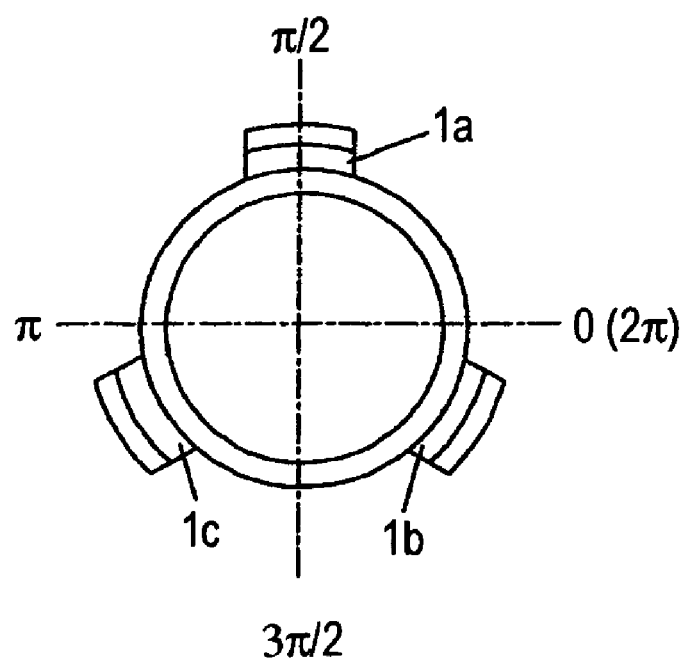
Figure 4:
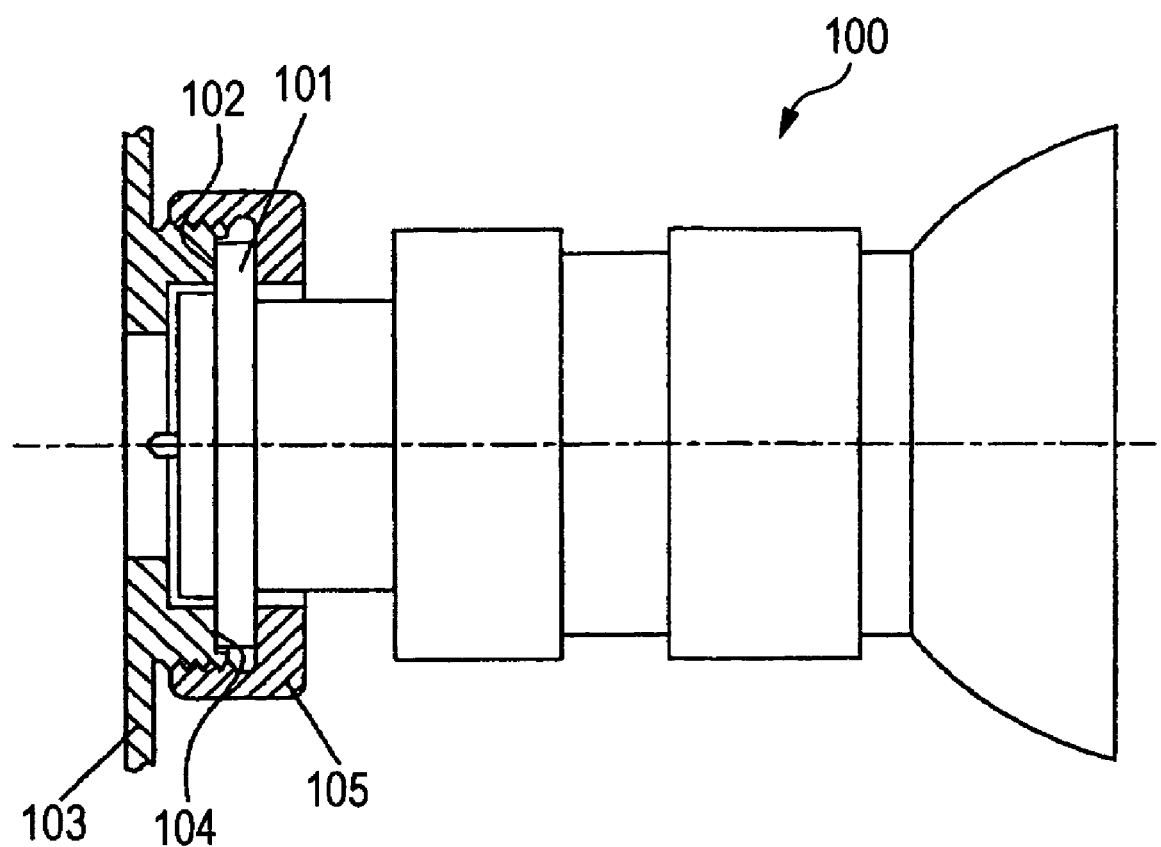
FIG. 4 is a view showing a lens mount structure according to a conventional technique.

As shown in FIG. 3B, in the present embodiment, when the lens barrel is mounted on the camera main body, the flange portion 1a retained by the retaining portion 4a is arranged in an upper half side of the periphery of the lens barrel (within the range of 0 to $\pi$); the flange portion 1b retained by the retaining portion 4b comes to a lower left side of the periphery of the lens barrel (within the range of $3/2\pi$ to $2\pi$); and the flange portion 1c retained by the retaining portion 4c is arranged within the lower right side of the periphery of the lens barrel (within the range of $\pi$ to $3/2\pi$).

The lens mount structure of the present invention has at least two flange portions formed along the outer periphery 11 of the base body of the lens barrel 10.

Preferably, the lens mount structure of the present invention has at least three flange portions formed along the outer periphery 11 of the base body of the lens barrel 10. The flange portions are retained by the retaining portions formed on the cylindrical mount 20 disposed on the front of the camera main body 21. The reference surface 2 is formed on at least one flange portion disposed in an upper half of the periphery of the lens barrel (within the range of 0 to $\pi$) so as to face the center of gravity of the lens barrel; the reference surface 2 is formed on at least one flange portion disposed in the lower left side of the periphery of the lens barrel (within the range of $\pi$ to $3/2\pi$) so as to face the center of gravity of the lens barrel; and the reference surface 2 is formed on at least one flange portion disposed in the lower right side of the periphery of the lens barrel (within the range of $3/2\pi$ to $2\pi$) so as to face the center of gravity of the lens barrel. The reference surfaces 2 are brought into contact with the retaining surfaces 5 of the retaining portions, thereby aligning the lens axis of the lens barrel.

In the present embodiment, after the ground faces 3 of the three flange portions 1a to 1c formed along the outer periphery 11 of the base body of the lens barrel have been grounded on the mount surfaces 6 at areas of the cylindrical mount 10 formed on the front 21 of the camera main body where no retaining portions are formed, the lens barrel 10 is rotated so as to slide the flange portions 1a to 1c and cause them to enter the respective retaining portions 4a to 4c.

Specifically, the ground surface 3 of the flange portion 1a of the lens barrel 10 is grounded on the mount surface 6 of the retaining portion non-formation portion located on the left side of the retaining portion 4a formed on the cylindrical mount 20 (see FIG. 2B). The ground surface 3 of the flange portion 1b of the lens barrel 10 is grounded on the mount surface 6 of the retaining portion non-formation portion located on the left side of the retaining portion 4b. The ground surface 3 of the flange portion 1c of the lens barrel 10 is grounded on the mount surface 6 of the retaining portion non-formation portion located on the left side of the retaining portion 4c. Subsequently, the lens barrel 10 is rotated clockwise, thereby sliding the respective flange portions 1a to 1c and causing them to enter the respective retaining portions 4a to 4c.

At least one retaining portion is provided with a latching member to latch clockwise rotation of the flange portion inserted into the retaining portion, thereby preventing removal of the flange portion from the right side of the retaining portion. Further, there is provided a rotation regulation member which inhibits counterclockwise rotation of the flange portion inserted into the retaining portion, to thus prevent removal of the flange portion from the left side of the retaining portion.

In the present embodiment, a protruding latch member is provided on the right end of the retaining surface of the retaining portion 4a, to thus latch counterclockwise rotation of the flange portion inserted into the retaining portion. Thus, removal of the flange portion 1a from the right side of the retaining portion 4a is prevented. A rotation regulation member formed from a movable latch pin is provided on the left end of the retaining surface of the retaining portion 4a, to thus inhibit counterclockwise rotation of the flange portion inserted into the retaining portion. Thereby, removal of the flange portion 1a from the left side of the retaining portion 4a is prevented.

Specifically, when the lens barrel 10 is mounted on the camera main body 21, the flange portion 1a is slid so as to enter the retaining portion 4a as a result of clockwise rotation of the lens barrel. At this time, the protruding latch member formed on the right end of the retaining surface of the retaining portion 1a prevents the flange portion 1a inserted into the retaining portion 4a from sliding and coming out of the right side of the retaining portion 4a. Moreover, the rotation regulation member formed on the left end of the retaining surface allows insertion of the flange portion 1a into the retaining portion 4a as a result of clockwise rotation of the lens barrel 10, thereby preventing removal of the flange portion 1a from the retaining portion 4a, which would otherwise be caused by counterclockwise rotation.

When the lens barrel 10 is removed from the camera main body 21, the rotation regulation member allows counterclockwise rotation of the lens barrel 10, thereby removing the flange portion 1a inserted into the retaining portion 4a.

According to the present invention, in the lens mount structure used for mounting on the camera main body the lens barrel whose center of gravity is situated at the position where the flanges are formed, the reference surfaces 2 of the flange portions 1a to 1c are formed so as to face the center of gravity of the lens barrel. Further, the reference surfaces 2 are given slopes. The reference surfaces are brought into contact with the retaining surfaces 5 of the retaining portions 4a to 4c under the weight of the lens barrel, thereby aligning the lens optical axis of the lens barrel mounted on the camera main body. Therefore, even when clearance exists between the retaining portions and the flange portions, the lens optical axis of the lens barrel can be aligned with high accuracy.

Even when clearance exists between the retaining portions and the flange portions, the lens optical axis of the lens barrel can be aligned with high accuracy. Therefore, there is obviated a necessity for provision of a mechanism for retaining and adjusting the flange portions (e.g., a mechanism for adjusting widths of the retaining portions by means of screw-engagement) Hence, the lens barrel can be readily mounted on the camera main body.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The present application claims foreign priority base bodyd on Japanese Patent Application No. JP2004-88703, filed Mar. 25 of 2004, the contents of which is incorporated herein by reference.

What is claimed is:

1. A lens mount structure, comprising:
a lens barrel including a base body and flanges along an outer periphery of the base body, the lens barrel having a center of gravity between a front edge of the lens barrel and the flanges, each of the flanges having a reference surface on a side thereof facing the center of gravity of the lens barrel, the reference surface including a slope with respect to a plane perpendicular to a lens optical axis, said slope tilting radially with respect to said lens optical axis; and
a cylindrical mount disposed in front of a support unit, the cylindrical mount having portions, each of the portions retaining one of the flanges so that the lens mount structure mounts the lens barrel to the support unit, each of the portions of the cylindrical mount having a retaining surface in contact with said reference surface of a corresponding one of the flanges so that the portions of the cylindrical mount retain the flanges of the lens barrel, and the reference surface aligns the lens optical axis of the lens barrel mounted on the support unit.

2. The lens mount structure according to claim 1, wherein the slope is an angle of 20° to 45° with respect to the plane perpendicular to the lens optical axis.

3. A lens barrels, comprising:
a base body; and
a flanges along an outer periphery of the base body, the lens barrel having a center of gravity between a front edge of the lens barrel and the flanges, wherein each of the flanges has a reference surface on a side thereof facing the center of gravity of the lens barrel and the reference surface has a slope with respect to a plane perpendicular to a lens optical axis, said slope tilting radially with respect to said lens optical axis.

4. A cylindrical lens mount for engaging a lens barrel which includes flanges disposed along an outer periphery of a base body, the cylindrical lens mount comprising:
portions, each of the portions retaining one of the flanges so that a lens barrel is disposed in front of a support unit, each of the portions of the cylindrical lens mount having a retaining surface including a slope with respect to a plane perpendicular to a lens optical axis, said slope tilting radially with respect to said lens optical axis.

* * * * *